United States Patent
Cable et al.

(10) Patent No.: US 6,549,530 B1
(45) Date of Patent: Apr. 15, 2003

(54) INTEGRATED SIGNALLING FOR ASYNCHRONOUS NETWORKS

(75) Inventors: Julian Cable, Bishop Stortford (GB); Catherine Rosenberg, Danbury (GB); Hosame Hassan Abu-Amara, Richardson, TX (US); Alessandro Minato, Brentwood (GB)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/305,633

(22) Filed: May 5, 1999

(30) Foreign Application Priority Data

Jul. 16, 1998 (GB) .............................. 9815422

(51) Int. Cl.[7] .............................................. H04B 7/212
(52) U.S. Cl. ..................... 370/347; 370/310; 370/431
(58) Field of Search ................................. 370/347, 338, 370/474, 431, 349, 330, 310–316, 277, 280, 328–329, 337, 344, 395.1–395.64, 400, 401; 455/12.1, 427; 725/25; 709/238

(56) References Cited

U.S. PATENT DOCUMENTS

| | | | | |
|---|---|---|---|---|
| 5,481,546 A | * | 1/1996 | Dinkins ..................... 370/95.1 |
| 5,592,470 A | * | 1/1997 | Rudrapatna et al. ......... 370/320 |
| 5,627,836 A | * | 5/1997 | Conoscenti et al. ......... 370/397 |
| 5,699,355 A | * | 12/1997 | Natarajan ................... 370/322 |
| 5,708,961 A | * | 1/1998 | Hylton et al. ................. 455/4.2 |
| 5,872,786 A | * | 2/1999 | Shobatake .................. 370/398 |
| 6,188,684 B1 | * | 2/2001 | Setoyama et al. .......... 370/352 |
| 6,216,166 B1 | * | 4/2001 | Zheng et al. ................ 709/238 |
| 6,243,382 B1 | * | 6/2001 | O'Neill et al. ............... 370/395 |
| 6,377,561 B1 | * | 4/2002 | Black et al. ................. 370/330 |

FOREIGN PATENT DOCUMENTS

DE 0523648 A1 * 1/1993 ........... H04L/12/56

OTHER PUBLICATIONS

Akyildiz, 1997, IEEE 0163–6804/97, "satellite ATM networks: A survey".*
Mito, 1996, IEEE 0–7803–3250–4, "B–ISDn signalling protocol process. for large multiplexed subscriber system".*

* cited by examiner

*Primary Examiner*—Daniel Hunter
*Assistant Examiner*—C. Chow
(74) *Attorney, Agent, or Firm*—Barnes & Thornburg

(57) ABSTRACT

A multiple access asynchronous network segment for providing network access to a plurality of end systems over a shared medium uplink to a satellite headend supported by a network controller, wherein the network controller allocates part of the uplink resource and the satellite headend allocates part of the uplink resource on a temporary basis in response to end systems making a new request for uplink resource. Also provided is a signalling system for use in a multiple access asynchronous network segment for providing network access to a plurality of end systems over a shared medium uplink to an intermediate. Also provided is an Integrated Addressing and packet Segmentation And Reassembly (IASAR) system for use in a multiple access asynchronous network segment for providing network access for a plurality of end systems to an intermediate system over a shared medium.

37 Claims, 9 Drawing Sheets

INTEGRATED SIGNALLING FOR ASYNCHRONOUS NETWORKS

FIELD OF THE INVENTION

The present invention relates to integrated signalling mechanisms for ATM-like services in shared medium networks. A shared medium network is a network that contains at least one multiple access (MA) segment. Users of a MA segment share a common medium link to access the network.

Shared medium segments may be classified according to their topologies, for example, ring topology (eg. a LAN), bus topology and star topology. The present invention is mainly applicable to shared medium segments having a star topology, which means that end systems on the network which share the shared medium cannot communicate directly with each other. Instead all end systems in the MA segment communicate with a headend, which is essentially a switch. The headend is responsible for routing traffic from the end systems of the shared medium segment to other end systems in the segment or to other parts of the network (the wide area network) and for routing traffic from the wide area network to the end systems.

This type of segment is essentially asymmetric in the sense that end systems share a common medium uplink to communicate with the headend, while the headend has a dedicated downlink to communicate with all the end systems. Problems are created by the reception of the same ATM stream (containing all traffic directed to all end systems in the segment) by all the end systems in the segment and by all the end systems in the segment having to compete to establish connections or calls on the common medium to communicate with the headend. These problems are exacerbated when there are large numbers of users in a segment.

The ATM stream may carry data traffic, ATM signalling traffic (eg. information for setting up a connection or call on the network) and ATM management traffic (eg. network administration information, including registration of end users).

An example of a shared medium network with star topology is a network, as shown in FIG. 1. The network in FIG. 1 has one MA segment, or common medium beam (2).

In adapting ATM to shared medium segments, a number of problems have to be solved. These include, maximising the useable amount of the shared medium bandwidth for data traffic, identifying the source of traffic in order to control access to the shared medium and for billing purposes and reducing delays to end systems for access to the shared medium. In addition where the headend comprises a geostationary satellite (4) supported by a ground based network controller (6), as shown in FIG. 1, propagation delay effects have to be minimised, for example, by reducing the number of messages exchanged to set up a call. Also, when the headend is a satellite a large number of end system have to be catered for on the common medium.

Furthermore, standard ATM virtual channels (VCs) which may have to be modified in order to transmit them over the shared medium segment, must appear to be standard ATM VCs to the wide area network and the end systems, if the shared medium segment is to be able to operate as part of a wide area network which uses conventional end system processing. Management VCs originating and terminating within the shared medium segment may be modified within the ATM Adaptation layers, but must be supported in an unmodified manner above this layer. In particular, the SNMP (Simple Network Management Protocol) layer of the ILMI (Interim Local Management Interface) must be unmodified. Also, signalling VCs originating and terminating within the shared medium may be modified within the ATM Adaptation layers but must be supported in an unmodified manner above this layer. In particular the call signalling layer (eg. Q.2931, PNNI, B-ISUP, BICI, AINI) should remain unchanged, ie. the SAAL (Signalling ATM Adaptation Layer) must provide a conventional SAAL service.

In a geostationary satellite system, round trip delay (ie. propagation delay for messages sent from an end system to the satellite and for response from the satellite to the end system) is high. Wireless telephony solutions such as GSM (Global System Mobile) tend to require multiple exchanges between an end system and an intermediate system in order to establish a call and so can generate unacceptable delays.

Conventional wireline ATM systems are known which operate in a point to point manner whereby a dedicated two-way simultaneous link exists between a port on an end system and a port on an intermediate system. The intermediate system performs four basic functions; cell relay, ATM end system registration, ATM peer intermediate system registration and ATM signalling. In a shared medium segment the activities of the intermediate system will have to be dealt with by the headend of the segment in combination with a NCC (Network Control Centre). For a network segment with a satellite headend the NCC will generally be ground based and thus physically separated from the headend.

The cell relay function consists of receiving a cell, examining the cell header, forwarding the cell to the appropriate output port and replacing the cell header with a new cell header.

The ATM end system registration function consists of allocating a unique address to each end system and associating the address with the appropriate intermediate system port. This is done by concatenating the end system's unique address with the intermediate system's assigned address. An automatic process using the SNMP of the ILMI conventionally does this over a standard VC identified by Virtual Path Identifier VPI=0 and Virtual Channel Identifier VCI=16 during the set up of the link between the port of the intermediate system and the end system.

The ATM peer intermediate system registration function consists of exchanging routing information with peer intermediate systems and associating routing information with each link to another intermediate system.

The ATM signalling function consists of exchanges between end systems and peer intermediate systems to establish call routing information which is subsequently used by the cell relay function. The system relies on having individual duplex signalling and ILMI channels to each end system. The ATM signalling protocol is run over a standard VC identified by VPI:VCI (0:5). The ATM signalling function also relies on the Service Specific Connection Orientated Protocol (SSCOP) to provide assured data delivery between peer signalling entities, eg. end systems and intermediate systems or peer intermediate systems.

SSCOP provides reliable transport of ATM signalling messages between two signalling entities using timeouts and retransmissions. The sender periodically sends a POLL Protocol Data Unit (PDU) to enquire about the state of the receiver. The receiver replies with a STAT PDU to tell the sender which packets were correctly received. The sender then uses the STAT messages to adjust its window size and retransmit lost packets. Once an SSCOP connection is established between two signalling entities it is kept alive by exchanging 'keep alive' messages periodically.

Conventional wireline ATM systems use the physical port on the intermediate system to identify the end system at the interface between a single end system and its associated intermediate system.

If multiple users are required per port an ATM Forum UNI 4.0 can be used to support the multiple users using a virtual UNI concept. The virtual UNI concept assigns each end user one or more Virtual Path Connections (VPCs) using the VPI addressing field and the UNI uses a VP cross-connect to combine the user VPCs so that the intermediate system effectively sees a single end system. As the VPI addressing space comprises a single octet, there is a limit of 256 end systems per port.

An improvement of the Virtual UNI scheme is possible where the 24 bits of VPI (8 bits) and VCI (16 bits) are re-partitioned to give more to the VPI. For example an even division giving the VPI 12 bits could support 4000 end systems with 4000 VCs. It may happen that the 24 bit VCI/VPI space is already reduced to fewer bits by some systems that wish, for example, to use part of the space as an internal switch routing label.

Local Area Network (LAN) systems address every Protocol Data Unit (PDU) with a source address and a destination address. This enables logical point to point channels to be established over the LAN. The PDUs used in LANs are typically large with respect to the size of the addressing information. This is not the case in ATM networks in which addresses will be larger because of the larger number of end systems and the PDUs are smaller.

The end systems sending traffic to a headend via a common medium segment have to have their access to the common medium controlled to avoid interference between cells from different end systems. There are two fundamental methods of doing this medium access control (MAC) which are in common use. One is contention or random access in which end systems send call set up requests to the headend on a random basis. If the request is received by the headend, the headend informs the end system accordingly by sending an acknowledgement message and allocates the end system slots (eg. time-slot/frequency-slot pairs in a MF-TDMA uplink) on the common medium uplink on which it can send traffic. If the request is not received by the headend the end system waits and then tries again to send a call set up request. The other is controlled access in which each end system is allocated slots in the common medium uplink on which it can transmit a call set up request. This guarantees the end system a dedicated slot to set up a call. However, this takes up resource (ie. slots) from the common medium uplink which may not always be utilised by the end system and the dedicated slots may be separated in time such that delays are added to call set up because the end system has to wait for the dedicated slot in order to transmit a call set up request.

In a MF-TDMA scheme, the time slots allocated to an end system by the intermediate system could be in different frequencies and may not be adjacent. Each time slot carries one ATM cell. The MF-TDMA signal that carries ATM cells from all the end systems in a multiple access link is demultiplexed into a single ATM stream that is delivered to a port in the intermediate system. Due to the access mechanism ATM cells that were transmitted consecutively by an end system may arrive at the port in the intermediate system interleaved with ATM cells that were sent by another end system. The intermediate system processes all incoming cells consecutively. It checks the VPI/VCI value in each ATM cell and puts all the cells with the same VPI/VCI in the same queue to be reassembled. In conventional ATM signalling many end systems on the same shared medium use the same VPI/VCI value for signalling messages and at least some of these signalling messages may need to be segmented into a number of ATM cells. A signalling message generated by a first end system is segmented into a number of ATM cells identified by a VPI/VCI. These ATM cells are then transmitted using the time slots allocated to the first end system. A signalling message generated by a second end system is also segmented into a number of ATM cells identified by the same VPI/VCI. These ATM signalling cells are then transmitted using the time slots allocated to the second end system. At the receiving port of the intermediate system, the time slots allocated to the first end system may be interleaved with the time slots allocated to the second end system, and so the intermediate system will not be able to distinguish between ATM signalling cells from the first and second end systems and so will be unable to reassemble the signalling messages from the two end systems correctly. Therefore, it is necessary that the ATM cells from the different end systems are distinguishable from each other in some way, or that each signalling message fits into a single ATM cell.

A conventional signalling adaptation layer structure or SAAL of an end systems (8,10) and an intermediate system (4,6) is shown in FIG. 6. The SSCOP layer provides flow control and error recovery. In normal operation peer SSCOP entities (eg. in an end system and an intermediate system) exchange keep alive messages. This is used to detect link failure. The SSCOP state, ie. whether the SSCOP is up or down, is conventionally propagated to the signalling layer Q.2931 as an indication of the state of the SAAL and is used to control the behaviour of the signalling layer. The SSCOP state is in turn dependent on the state of the ATM layer and the physical layer.

In a conventional point to point wireline system there is a dedicated physical link (the physical layer) between the end system and the intermediate system. Part of the capacity of this link is dedicated to ATM signalling traffic. As long as the physical link is available, an SSCOP connection can be kept alive by sending messages between peer SSCOPs at regular intervals, so that a call can be established at any time without the need to bring up a new SSCOP connection. However, in a shared medium uplink, because the link between the end systems and the intermediate system are shared by all the end systems the capacity of the uplink is scarce and the keep alive messages will take up a some of this capacity, reducing capacity on the uplink for other traffic.

OBJECT OF THE INVENTION

The object of the present invention is to provide integrated signalling mechanisms for supporting an ATM-Like shared medium network which overcome at least some of the problems discussed above.

SUMMARY OF THE INVENTION

According to a first aspect of the present invention there is provided a multiple access asynchronous network system for providing network access to a plurality of end systems over a shared medium uplink to a satellite headend supported by a network controller, wherein the network controller comprises means for allocating part of the uplink resource and the satellite headend comprises means for allocating part of the uplink resource on a temporary basis in response to end systems making a new request for uplink resource.

According to a second aspect of the present invention there is provided a method for providing network access to a plurality of end systems over a shared medium uplink of a multiple access asynchronous network segment to a satellite headend, which satellite headend is supported by a network controller, comprising the steps of temporarily allocating uplink resource to an end system using the satellite headend in response to said end system making a new request for uplink resource and subsequently allocating uplink resource to said end system using the network controller.

The part of the uplink resource allocated to the satellite may be one or more channels of the shared medium uplink or one or more slots from the shared medium uplink. When a new request for uplink resource is made by an end system the satellite will, if it has resource available, allocate resource immediately on receiving the request on a temporary basis to allow the end system to start its call before the network controller allocates resource on the uplink permanently. It will take the network controller longer than the satellite to allocate resource because the new request for resource and the allocation of resource from the network controller have to be communicated between the end system and the network controller via the satellite.

According to a third aspect of the present invention there is provided a signalling system for use in a multiple access asynchronous network segment for providing network access to a plurality of end systems over a shared medium uplink to an intermediate system wherein the intermediate system comprises means for allocating an address to each end system and means for inserting the end system address into the VPI/VCI space of a cell which is to be transmitted over the segment and which is associated with that end system using substantially all the VPI/VCI space of the cell. By using all of the VPI/VCI space available in a cell, which is usually 24 bits, to contain end system addresses, the number of end systems which can be addressed is vastly increased and so the segment is able to support more end systems.

Preferably, each end system comprises means for inserting the end system address into the VPI/VCI space of a cell which is associated with that end system and which is to be transmitted over the segment using substantially all the VPI/VCI space of the cell.

Preferably, the intermediate system allocates each end system a signalling address (i.e. signalling VPI/VCI), a management address (i.e. ILMI VPI/VCI) and/or a data address (i.e.connection VPI/VCI). Thus, a cell containing signalling information associated with an end system will contain that end system's signalling address also referred to herein as an ATM signalling virtual channel indicator, in the VPI/VCI space of the cell. If the cell is transmitted from the end system to the intermediate system on the shared medium uplink, the intermediate system will recognise it as a cell from that end system which contains signalling information. Similarly, a cell containing management (e.g ILMI) information associated with an end system will contain that end system's management address, also referred to herein as an Interim Local Management Interface (ILMI) virtual channel indicator, in the VPI/VCI space of the cell and a cell containing data associated with an end system will contain that end system's data address. This enables the intermediate system to identify the end system from which the cells originate and the type of data carried in the cell.

The intermediate system can allocate the addresses either statically or dynamically to end systems. Dynamic allocation is preferred because it increases the number of end users that can be accommodated on the uplink because, at any one time, only these end systems accessing the segment have an address allocated on them.

A broadcast downlink will generally supplement the shared medium uplink in the network segment and it is preferred that an address in the VPI/VCI space of a cell sent over the downlink to a particular end system is the same as the address in the VPI/VCI space of a cell sent on the uplink from that end system. This enables the end system to identify cells on the broadcast downlink that are intended for it by checking the VPI/VCI space of all cells transmitted on the downlink. Those cells that do not contain an address of that end system will be discarded by that end system.

According to a forth aspect of the present invention there is provided a signalling method for use in a multiple access asynchronous network segment for providing network access for a plurality of end systems to an intermediate system over a shared medium uplink, in which substantially the entire VPI/VCI space of a cell transmitted over the segment is made available to contain an address of an end system associated with that cell.

Dynamic allocation of end system addresses using the VPI/VCI space, is preferred because end system addresses will only be required for the proportion of end systems using the MA segment at any one time. When end system addresses are allocated permanently (ie. static allocation) then all the end systems which can access the MA segment require dedicated addresses.

Preferably, for point-to-multipoint connections when there are a plurality of receiving end systems in the same multiple access asynchronous network segment an intermediate system dynamically allocates the same end system address to all said plurality of receiving end systems. In this way, a single copy of each cell can be relayed on the downlink of each such segment and all the receiving end systems on that segment will receive it. This reduces traffic on the broadcast downlink, which is a scarce resource.

Where the allocation of a signalling address, also referred to as an ATM signalling virtual channel indicator (VCI), to each end system is dynamic, preferably the end systems and intermediate system comprise a signalling layer and an SSCOP layer arranged so that an SSCOP connection between an end system and the intermediate system can be broken without effecting the operation of the signalling layer.

According to a fifth aspect of the present invention there is provided an Integrated Addressing and packet Segmentation And Reassembly (IASAR) system for use in a multiple access asynchronous network segment for providing network access for a plurality of end systems to an intermediate system over a shared medium, wherein the end systems and the intermediate system comprise means for inserting a Multiplexing Identifier (MID) address header designating an end system into every ATM cell generated from the segmentation of a packet. The end systems and the intermediate system preferably also comprise means for extracting an MID address header designating an end system from each received ATM cell before reassembling the packet. The packet may contain a signalling or management message.

According to a sixth aspect of the present invention there is provided a method for Integrated Addressing and packet Segmentation And Reassembly (IASAR) system for use in a multiple access asynchronous network segment for providing network access for a plurality of end systems to an intermediate system over a shared medium, comprising the steps of segmenting a packet to generate a group of cells and inserting a MID address header designating an end system into each cell of this group. Preferably, the method additionally comprises the steps of extracting a MID address header designating an end system from each received cell and reassembling the packet from a group of cells with the same MID.

In a preferred embodiment of the fifth and sixth aspects of the present invention, a multiplicity of signalling channels each associated by a MID address header with an individual end system are carried over a single virtual channel (VC). The multiplicity of signalling channels correspond to the multiplicity of end systems. By using the MID address header to identify the end system, a single signalling VC, can then be shared by a multiplicity of end systems. Effectively, the MID address header multiplexes a plurality of signalling channels onto a single virtual channel.

Similarly, a multiplicity of ILMI management channels each associated by the MID address header with an individual end system can be carried over a single virtual channel (VC).

In a preferred embodiment of the fifth and sixth aspects of the present invention the ATM Adaptation Layer for the signalling and ILMI stack of an end system and/or intermediate system SAAL comprises an AAL ¾ ATM Adaptation layer including a Packet Segmentation and Reassembly sub-layer for generating ATM cells which include a multi-bit field for the MID address header. The AAL ¾ ATM adaptation layer may comprise a Service Specific Convergence Sublayer (SSCS), which in the preferred embodiment of the present invention is the SSCOP layer, a Common Part Convergence Sublayer (CPCS), as well as the Segmentation and Reassembly (SAR) Sublayer. SAR Protocol Data Units of AAL ¾ include a 10-bit field for the Multiplexing Identifier header. Therefore AAL ¾ allows the multiplexing of a maximum of 1024 signalling or management connections in the same VPI/VCI.

According to a seventh aspect of the present invention there is provided an intermediate system for use in a multiple access asynchronous network segment for providing network access for a plurality of end systems to an intermediate system over a shared medium uplink, wherein the intermediate system comprises means for receiving a meta-signalling message from an end system containing the MAC address of that end system, means for allocating a signalling VC and/or a management VC and a Multiplexing Identifier (MID) value to that end system and means for transmitting a meta-signalling message to the end systems in the network segment containing the MAC address of that end system and the allocated VC(s) and MID value.

According to an eighth aspect of the present invention there is provided a signalling method for use in a multiple access asynchronous network segment for providing network access for a plurality of end systems to an intermediate system over a shared medium uplink, in which the intermediate system allocates a signalling VC and/or management VC and a Multiplexing Identifier (MID) value by means of an exchange of meta-signalling messages between the end system and the intermediate system which meta-signalling messages contain the end systems MAC address.

Meta-signalling messages are 48 bytes long, so that they can fit in the payload of a single ATM cell. ATM cells containing meta-signalling messages are identified by a well-known VPI/VCI. All the end systems in a shared uplink use this VPI/CI for sending meta-signalling messages.

In a preferred implementation of the seventh and eight aspect of the present invention, the VPI value used for meta-signalling could be associated with the beam number in order to facilitate the routing of meta-signalling messages to the destination beam.

The MID values will be used by the AAL layer of the end systems and the intermediate systems to multiplex multiple signalling and/or management connections in the same VPI/VCI in the multiple access segment. The intermediate system uses the MAC address contained in the meta-signalling message sent by the end system to identify the end system that has requested the signalling VC and/or management VC. Each end system uses the MAC address contained in the meta-signalling message sent by the intermediate system to identify whether the allocation or denial of a signalling and/or management VC is for it.

According to the ninth aspect of the present invention there is provided a signalling method for use in a multiple access asynchronous network segment for providing network access for a plurality of end systems to an intermediate system over a shared medium uplink, comprising the steps of:

an end system generating a meta-signalling message containing a request for a signalling and/or a management VC and the MAC address of that end system and encapsulating the meta-signalling message in an ATM cell, identified by a predetermined VPI/VCI as containing meta-signalling information, the intermediate system processing all ATM cells with a meta-signalling VPI/VCI by;

either allocating a signalling and/or a management VC and a MID address to the end system, inserting the allocation and the MAC address of the end system in a "reply" meta-signalling message and encapsulating the "reply" message in an ATM cell with a meta-signalling VPI/VCI and transmitting it over the downlink, or generating a "denied" meta-signalling message including the MAC address of the end system and encapsulating the "denied" message in an ATM cell with a meta-signalling VPI/VCI and transmitting it over the downlink, wherein each end system receives and processes all ATM cells with a meta-signalling VPI/VCI by examining the MAC address contained in the meta-signalling message and if the MAC address is the MAC address of that end system retains the allocation for further processing or otherwise discards the allocation.

According to a tenth aspect of the present invention there is provided a signalling system for use in a multiple access asynchronous network segment for providing network access for a plurality of end systems to an intermediate system over a shared medium uplink wherein each end system and the intermediate system comprise a signalling layer and an SSCOP layer arranged so that SSCOP connections between each end system and the intermediate system can be broken without effecting the operation of the signalling layers. Preferably, the signalling layer in the end system comprises means for initiating sending of a message by joining together an SSCOP establishment message and a signalling call set up message to form a composite request message which is transmitted over the common medium uplink.

When the segment also comprises a broadcast downlink, it is preferred that the a signalling layer in the intermediate system comprises means for initiating sending of a message to one of the end systems, by joining together an SSCOP establishment message and a signalling call set up message to form a composite message which is transmitted over the common medium downlink.

According to an eleventh aspect of the present invention there is provided a signalling method for use in a multiple access asynchronous network segment for providing network access for a plurality of end systems to an intermediate system over a shared medium uplink wherein each end system and the intermediate system comprise a signalling layer and an SSCOP layer, comprising the steps of breaking SSCOP connections between each end system and the intermediate system without effecting the operation of the signalling layers. Preferably the method additionally comprises the steps of initiating sending of a message in an end system by joining together an SSCOP establishment message and a signalling call set up message to form a composite request message and transmitting said composite request message over the common medium uplink.

Where the segment comprises a broadcast downlink, the method preferably comprises the steps of initiating sending of a message in the intermediate system to one of the end systems by joining together an SSCOP establishment message and a signalling call set up message to form a composite message and transmitting said composite message over the common medium downlink.

In all of the abovementioned aspects of the present invention in a preferred embodiment the intermediate system comprises a satellite headend supported by a network controller. The network controller will generally be ground based.

BRIEF DESCRIPTION OF THE DRAWINGS

The present invention will now be described with reference to the accompanying Figures in which.

DETAILED DESCRIPTION OF THE PREFERRED EMBODIMENT

Figure 1:
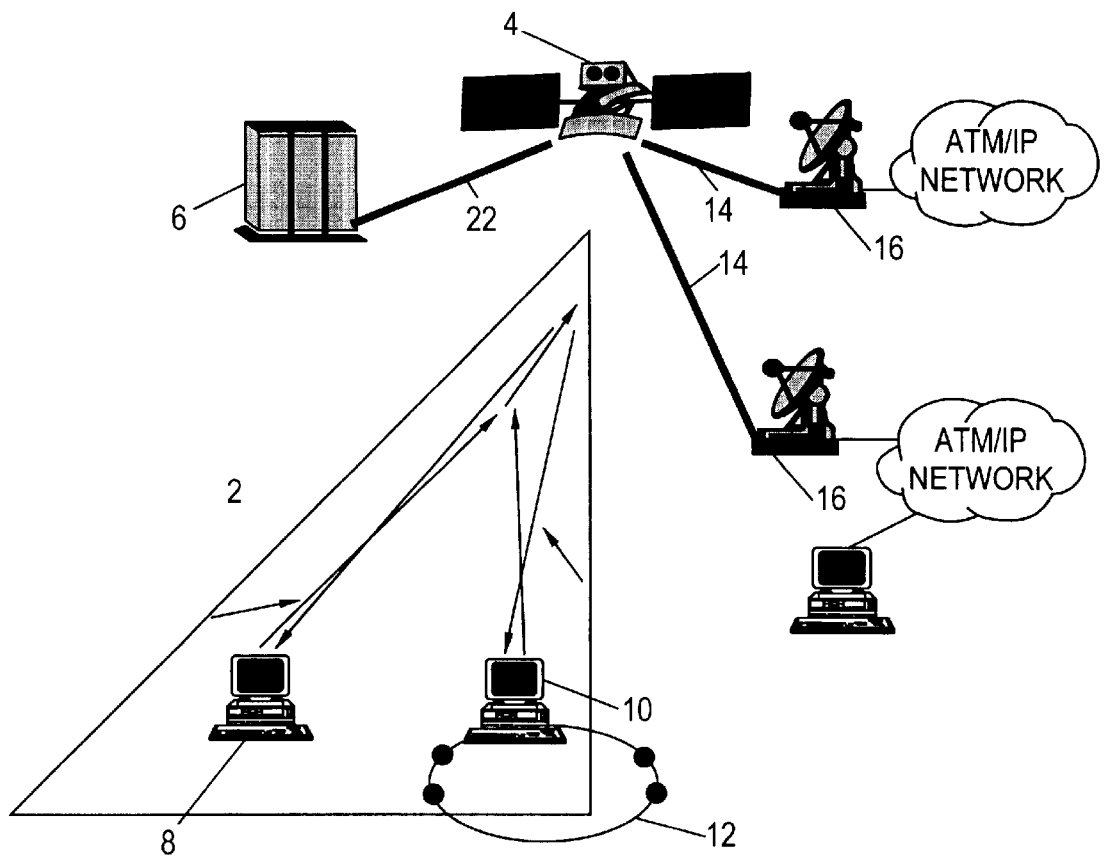
FIG. 1 is a schematic representation of a MA network according to the present invention,.

The geostationary satellite headend (4) of the satellite network of FIG. 1 has limited processing capacity and so is supported by a ground based Network Control Centre (NCC) (6). The satellite headend and the NCC together form the intermediate system for all the end systems using the multiple access asynchronous network segment (2). The satellite headend (4) receives traffic from a common medium uplink (2) used by a plurality of terminals (8) and/or a plurality of concentrators (10) to send traffic to the headend (4). Concentrator (10) is the link between LAN (12) and the multiple access segment (2). The traffic received by the headend (4) is forwarded either on point to point downlinks (14) to gateways (16) to other parts of the network or to other users of the common medium uplink (2) over a point to multipoint broadcast downlink (also labelled 2).

In a satellite system the burst time plan controller for the common medium is situated in the ground based controller (6) because the complexity of the algorithms used in the burst time planner are not compatible with the processing power available on a satellite (4). The burst time plan controller allocates slots on the common medium uplink (2). However, this increases the delay in setting up a call on the common medium uplink, because the satellite (4) must send and receive messages to and from the ground based controller (6) before time slots are available on the uplink (2) for setting up a call.

Figure 2:
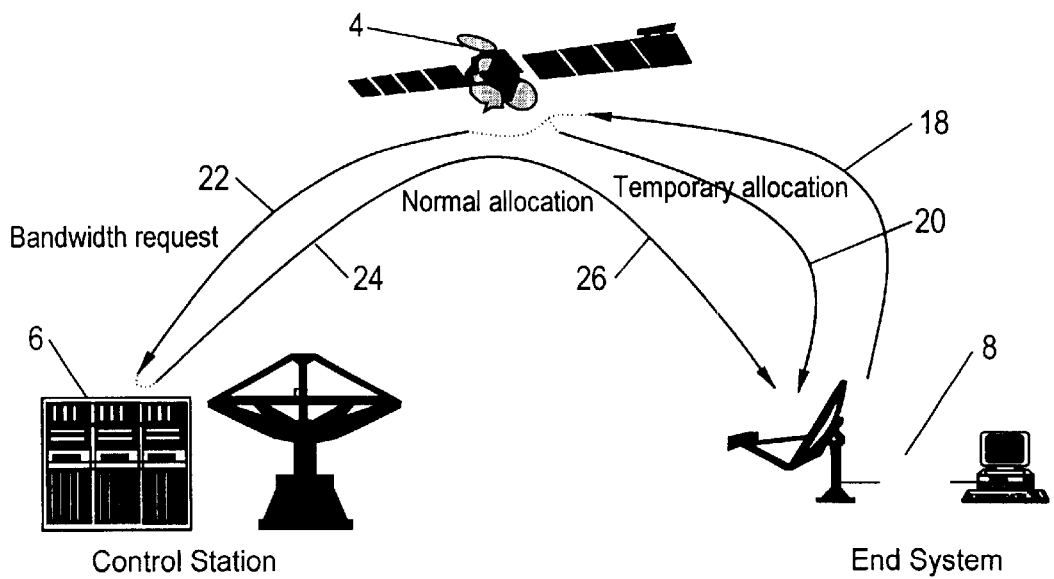
FIG. 2 is a schematic representation showing channels between an end system, satellite and ground based network control system according to the present invention.
Figure 3:
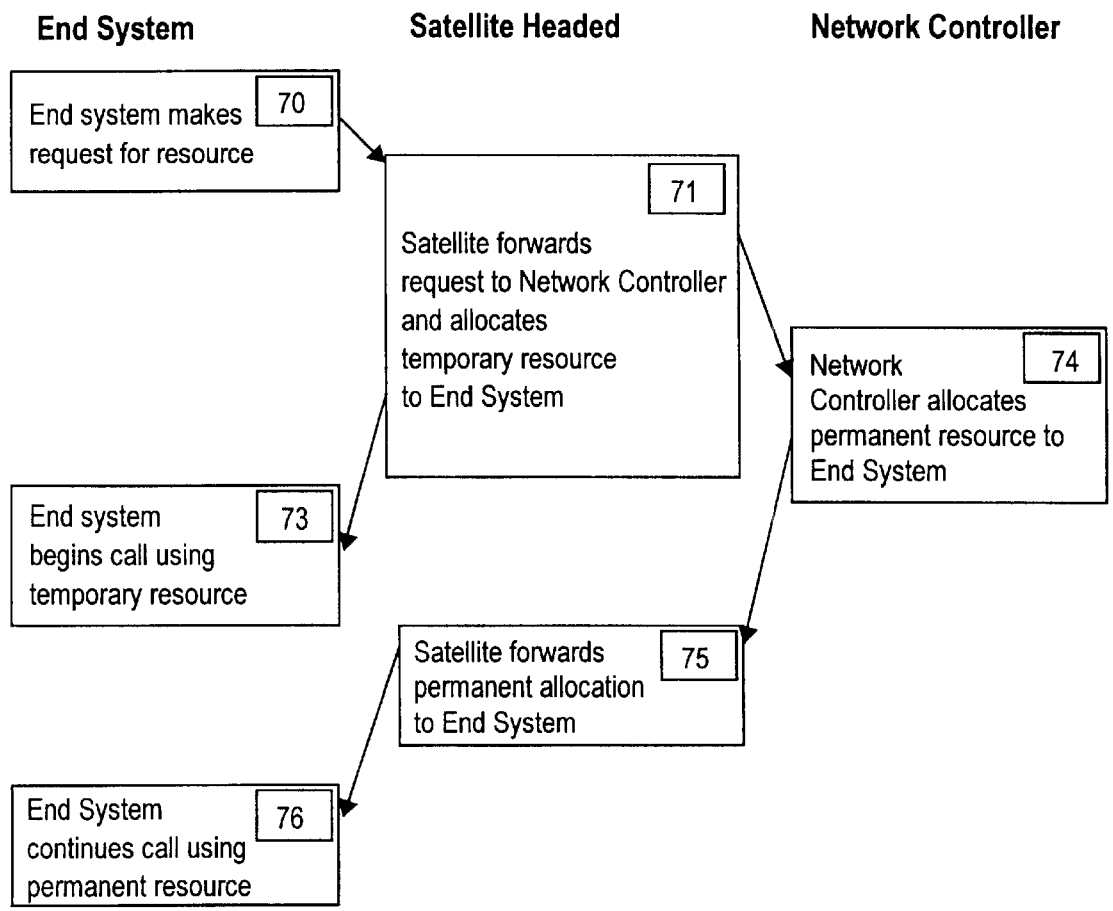
FIG. 3 is a schematic representation of the steps involved in allocating resource to an end system of FIGS. 1 or 2.

Therefore, the control of one or more channels, or one or more slots from the common medium uplink (2) is delegated to the satellite (4). The arrangement is shown in FIGS. 2 and 3. The end system, or terminal (8) uses a dedicated service request channel (18) of the common medium uplink (2) to request bandwidth (box 70, FIG. 3), for example, on a contention basis. The satellite (4) responds with an acknowledgement to the request on a dedicated channel (20) of broadcast downlink (2) and includes in the acknowledgement a temporary allocation from the one or more delegated channel or delegated pool of slots under its control (box 71, FIG. 3). The satellite (4) also forwards the request for bandwidth from the end system (8) to the ground based controller (6) over dedicated point to point downlink (22) (box 71, FIG. 3). The controller (6) makes a permanent allocation (box 74, FIG. 3) based on the burst time plan which it notifies to the satellite (4) over dedicated point to point uplink (24) which the satellite (4) forwards (box 75, FIG. 3) to the end system (8) over a channel (26) on the broadcast downlink (2). If the channels or slots which are delegated to the satellite (4) are full then the end system has to wait for a normal allocation via the controller (6). Therefore, for at least some calls, this will enable the end system (8) to establish a call (box 73, FIG. 3) and start to transmit data after one round trip (between the end system (8) and the satellite(4)), instead of after two round trips (one between the end system and the controller (6) and one between the controller (6) and the end system (8).

The amount of bandwidth delegated to the satellite (4) is a system parameter optimised (potentially dynamically) to the behaviour of the system so that most calls require only one round trip to the satellite to set up a call.

Therefore, the intermediate system for the MA segment is partitioned into the satellite (4) and the ground based NCC (6) so that the service request channel is terminated and the acknowledgements are generated by the satellite (4) and the normal uplink slot management functions are performed by a separate entity, the ground station (6). The temporary allocation made by the satellite (4) on the designated channels or slots controlled by the satellite are for one frame only to permit the end system to transmit its initial message before the normal allocation occurs.

According to one aspect of the present invention the entire VPI/VCI space in cells transmitted over the segment (2) is made available to allocate addresses to each end system (8). This enables a dedicated data address, a dedicated signalling address (also referred to herein as an ATM signalling virtual channel indication) and a dedicated management address (also referred to herein as an ILMI virtual channel indicator) to be allocated to all end systems (8) using the MA segment (2). Thus, the intermediate system (satellite headend (6) and network controller (4)) controls all assignments of addresses to end systems, preferably on a dynamic basis.

Figure 4:
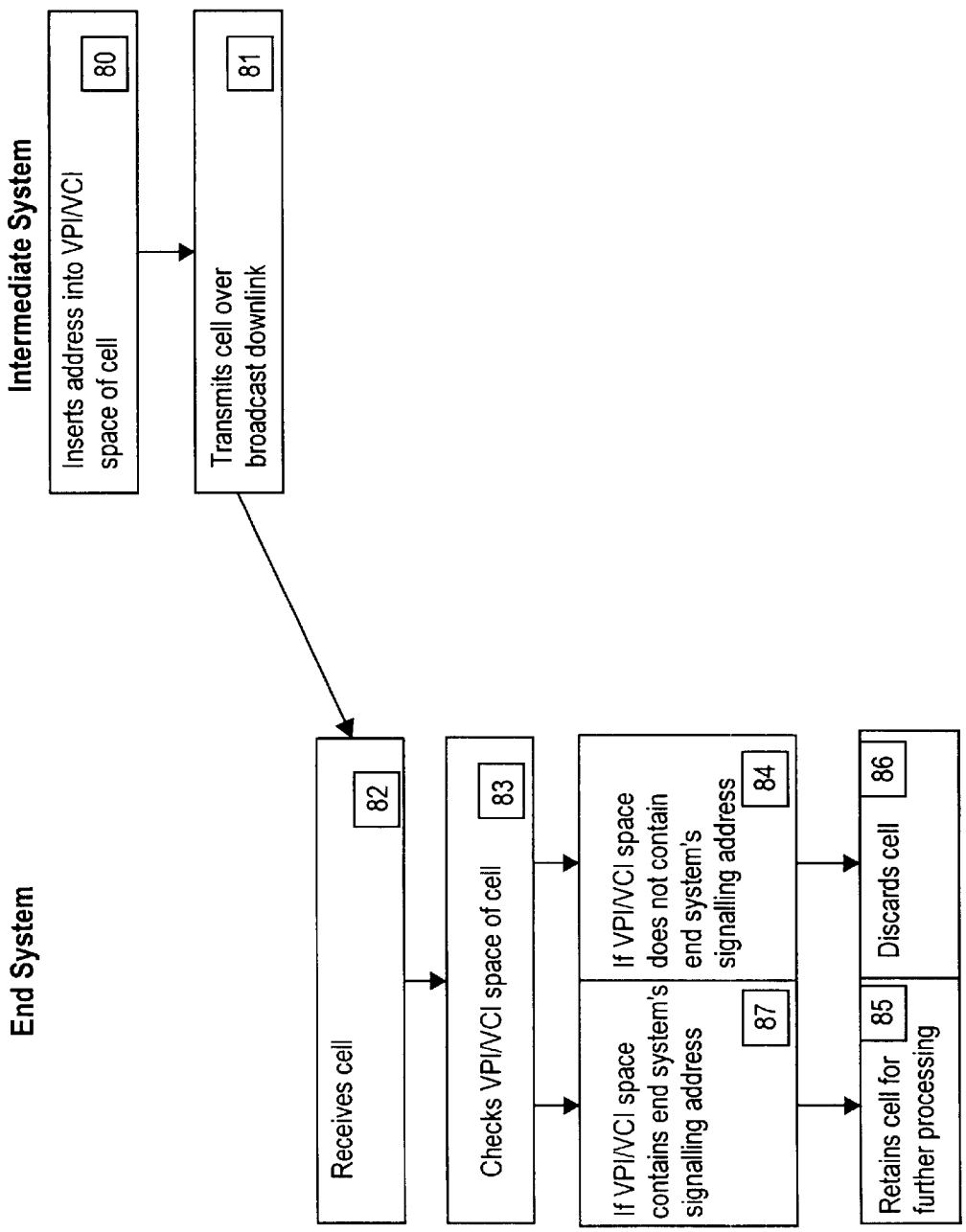
FIG. 4 is a schematic representation of the steps involved in transmitting a cell from an intermediate system to an end system with an address in the VPI/VCI space of the cell.

FIG. 4 shows how the signalling address in the VPI/VCI space is used to exchange signalling information between the intermediate system (4,6) and an end system (8,10). It is assumed that the end system (8,10) has already been allocated a signalling address (i.e. a VPI/VCI) by the intermediate system (4,6). The end system address is inserted into the VPI/VCI space of cells (box 80) to be transmitted (box 81) on the broadcast downlink (2) to the end systems by the intermediate system. All end systems (8,10) receiving the broadcast downlink (2) from the intermediate system (4,6) receive the cell (box 82) and check the VPI/VCI space of the cell (box 83). If the VPI/VCI space contains that end system's address (box 87) the cell is retained for further processing (box 85). Where each end system (8,10) is allocated a data address, a signalling address and a management address, the address will tell the end system what type of information is contained in the cell. If the VPI/VCI space does not contain that end system's address (box 84), then the cell is discarded (box 86).

Figure 5:
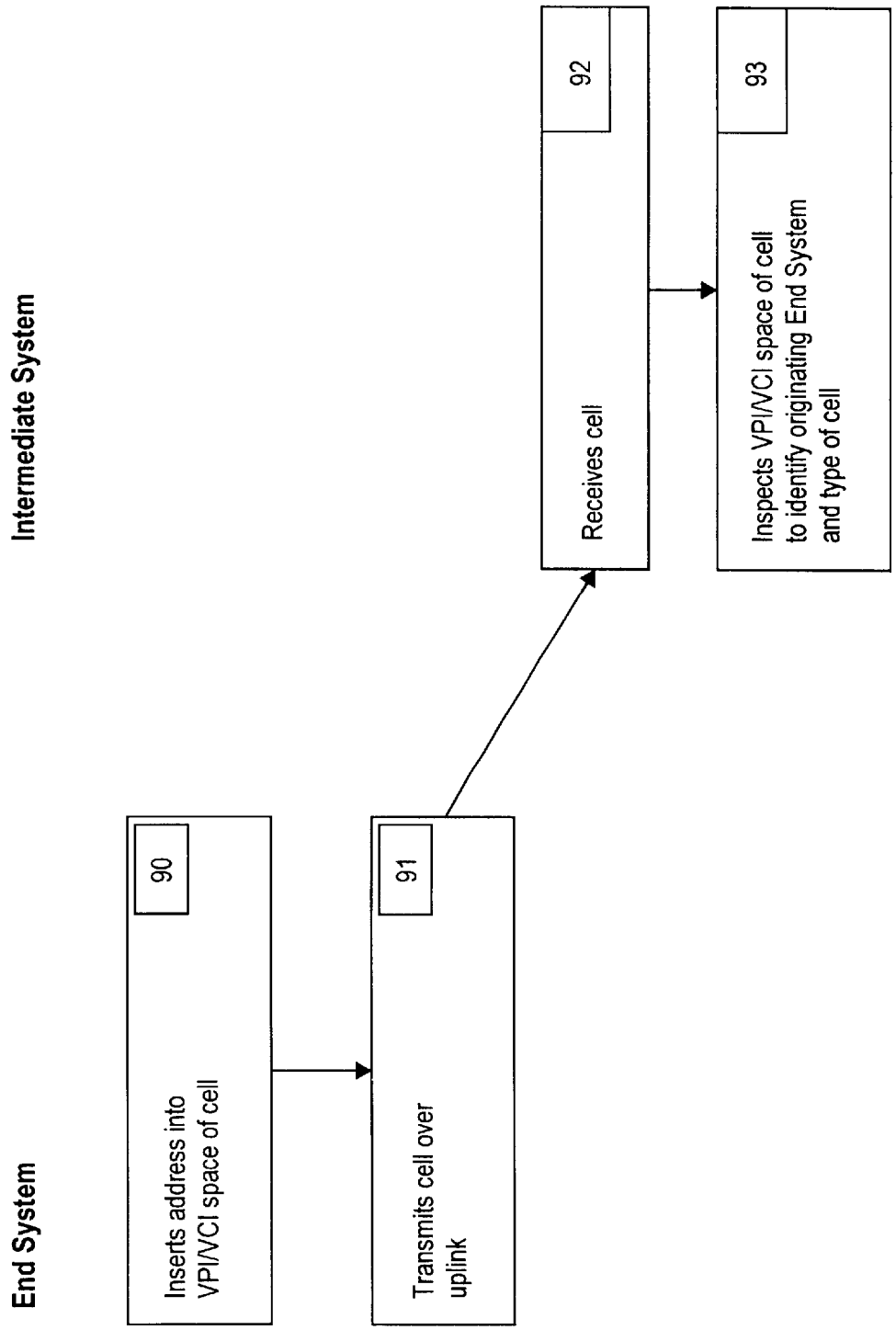
FIG. 5 is a schematic representation of the steps involved in transmitting a cell from an end system to an intermediate system with an address in the VPI/VCI space of the cell.

Similarly, referring to FIG. 5, when an end system (8,10) transmits a cell to the intermediate system over the uplink (2), it insert its address (which could be a data address, a signalling address or a management address depending on the type of information carried by the cell) into the VPI/VCI space of the cell (box 90) and transmits it over the uplink (box 91). The intermediate system (4,6) receives the cell (box 92) and inspects it to identify the end system from which the cell originated and the type of information contained in the cell (box 93).

For point-to-point connections the intermediate system dynamically allocates a VPI:VCI to each end system which forms an address which uniquely identifies that end system within the shared medium segment.

A duplex virtual channel is created which uses the same address in the VPI/VCI space of cells in both directions, ie. on the uplink and on the downlink, to effectively give a point-to-point link over the shared medium segment.

In addition to point-to-point connections, point-to-multipoint connections are conventional. When the receivers of a connection are not in the same shared medium segment then the call relay functions are also conventional and the cells must be copied to each output port. However, when there are two or more receiving end systems (8) of a connection within the same shared medium segment (eg. 2) then an improvement is implemented. During the call set-up phase, when the end system address is allocated, a process in the intermediate system (6) ensures that the same address is used for all end systems (8) on the same shared medium segment for the point-to-multipoint connection. Thus, only a single copy of each cell needs to be relayed to each downlink (2).

If encryption is to be applied to protect data intended for one end system from being interpreted by another end system it must be applied to the ATM payload and not to the ATM header which must be in plain text so that it can be interpreted by all end systems to select cells for that end system.

Conventionally, virtual channel VPI=0:VCI=5 is used to identify ATM signalling messages and virtual channel VPI=0:VCI=16 is used to identify ILMI management messages. However, in the present shared medium uplink system the VPI/VCI space is used to address the end systems.

One solution to this problem, when VPI/VCI is not a scarce resource is to statically allocate each end system in a MA segment its own signalling address and management address using the VPI/VCI space. Thus, each end system is permanently allocated an ATM signalling virtual channel indicator and an ILMI virtual channel indicator as well as a data address using VPI/VCI space.

However, if the satellite (4) has many uplinks (2) and has only one link to the ground based controller (6), the VPI/VCI addressing space has to be shared among all the uplinks, which tends to make the VPI/VCI a scarce resource. Furthermore, one network controller could support more than one satellite meaning that the VPI/VCI addressing space could have to be shared among all the uplinks of all the satellites supported by the controller.

It should be noted that if an end system can only accept signalling traffic on default channel VPI=0/VCI=5 then a translation between the end system signalling address in VPI/VCI space allocated to that end system by the intermediate system and the default channel has to take place at the terminal.

Another way of allocating ATM signalling and management VCs is to allocate a VPI/VCI value together with a Multiplexing Identifier (MID) address header as discussed below. This method allows a reduction in the number of VPI/VCIs used for signalling, since a multitude of end systems can use the same VPI/VCI for signalling.

Figure 7A:
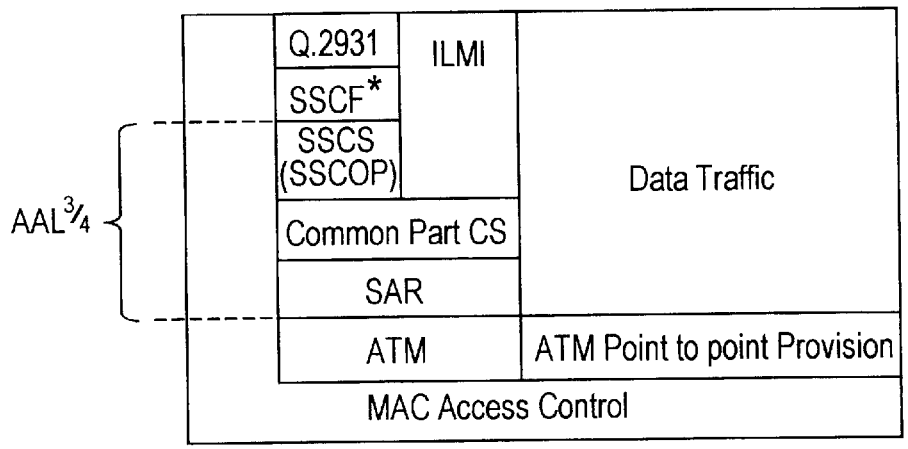
FIGS. 7a and 7b show the structure of a SAAL stack according to alternative embodiments of the present invention.
Figure 7B:
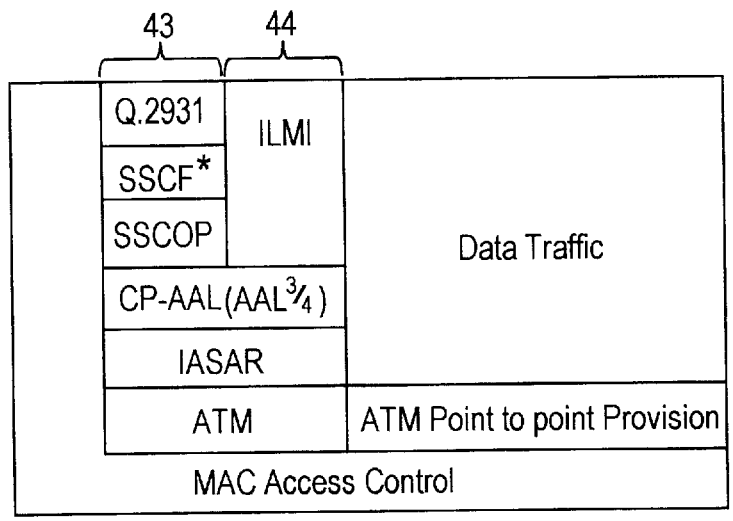

Referring now to FIGS. 7a and 7b which show two alternative SAAL protocol stacks for the signalling and traffic planes, the conventional virtual channel VPI/VCI-0:5 is used for signalling and the conventional virtual channel VPI/VCI-0:16 is used for ILMI management but the end system address is no longer entirely located in the VCI/VP space of cells transmitted over the segment but instead can be located partly in the VPI/VCI space of cells and partly in the payload of every cell belonging to a packet in such a way that the same VCI/VP can be shared among a number of end systems.

Figure 8:
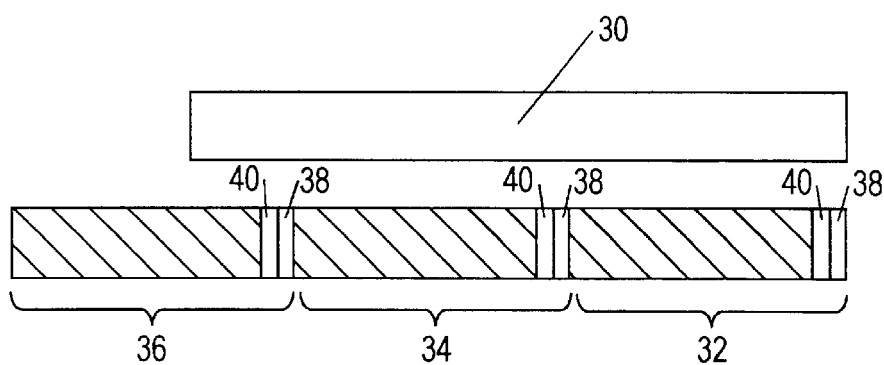
FIG. 8 is a schematic representation showing the segmentation of a data packet into ATM cells.

Referring to FIG. 8, a data packet (30) to be transmitted across the common medium (2) by a terminal (8) is first split into ATM cells (32,34,36) by the segmentation and reassembly layer (SAR in FIG. 7a and IASAR in FIG. 7b). Each ATM cell (32,34,36) has a header containing the VPI space (38) and the VCI space (40). These ATM cells are then reassembled in the intermediate system to reconstruct the data packet. The intermediate system takes all the ATM cells with a given VPI/VCI and reassembles them sequentially. However, due to the multiple access uplink these ATM cells may be interleaved with ATM cells sent by another end system sharing the same link. If the two end systems use a conventional AAL5 as the adaptation layer to segment a packet into cells (as in the conventional SAAL in FIG. 6) and the same VPI/VCI (as in a conventional system), the intermediate system is not able to distinguish between the ATM cells sent by the two end systems. In the present invention there is provided a system which inserts addressing information in the payload of every ATM cell belongings to a data packet transmitted by an end system or an intermediate system. The addressing information required to identify the end system, is herein referred to as a Multiplexing Identifier (MID) address header.

The SAAL stack in FIG. 7b comprises an Integrated Addressing and Segmentation and Reassembly (IASAR) layer is added between the ATM layer and the CP-AAL layer for the signalling and ILMI stack (43 and 44 respectively). This IASAR layer will have multiplexing capabilities that allow an end system to select only the ATM cells received by the end system which contain its VPI/VCI address in the cell header and its MID address in the payload of cells and to discard other cells that do not contain its address. The effect of the IASAR is to provide a dedicated logical signalling channel between the intermediate system and each end system on a given VPI/VCI and a number of these logical signalling channels are multiplexed onto the given VPI/VCI by the IASAR. The dedicated logical signalling channel on a given VPI/VCI is associated with a particular end system by the MID address header.

If it necessary to provide confidentiality to the signalling channel then this must be provided above the IASAR.

Figure 6:
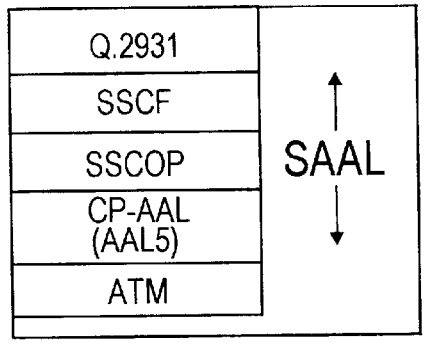
FIG. 6 shows a conventional SAAL stack.

In the SAAL stack in FIG. 7a the AAL5 ATM adaptation layer for the signalling stack in the conventional SAAL stack of FIG. 6 is replaced by the AAL¾ ATM adaptation layer in order to provide an Integrated Addressing and Packet Segmentation and Reassembly function. As can be seen in FIG. 7a, the AAL¾ ATM adaptation layer consists of a Service Specific Convergence sub-layer (SSCS) which forms the SSCOP layer, a Common Part Convergence Sublayer (CPCS) and a Segmentation and Re-assembly Sublayer (SAR). The ATM cells generated by the SAR in the AAL¾ layer include a 10-bit field for the MID address header and so the AAL¾ layer allows the multiplexing of a maximum of 1024 signalling or management connections in the same VPI/VCI.

Figure 9:
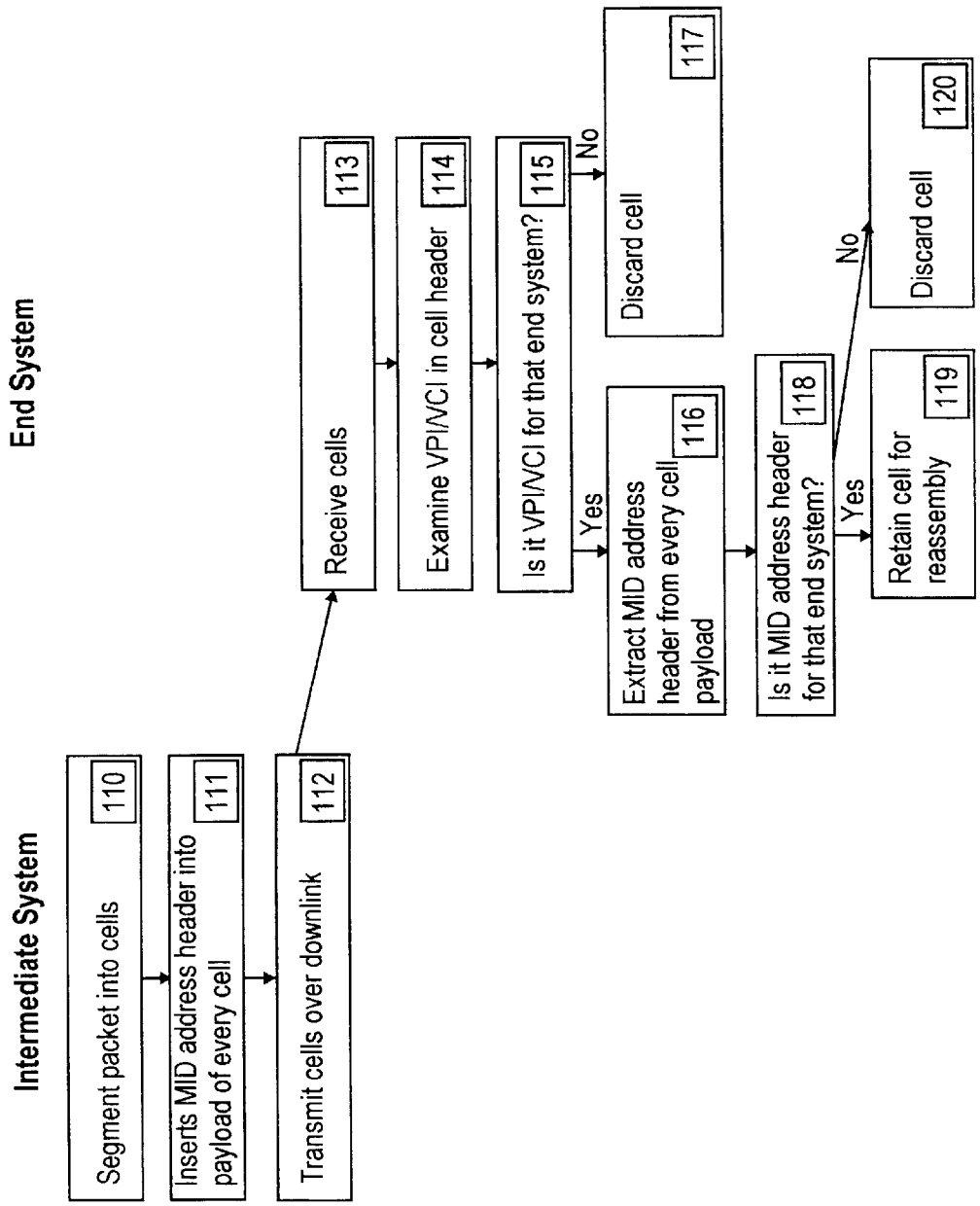
FIG. 9 is a schematic representation of the steps involved in transmitting a packet from an intermediate system to an end system with a MID header address in every cell of the packet.

Referring to FIGS. 8 and 9, to send a packet (30) of information from the intermediate system (4,6) to an end system eg. end system (8), the packet (30) is segmented into cells (32,34,36) (box 110) and a MID header for end system (8) is inserted into the payload of every cell (32,34,36) (box 111). If the information carried by the cells is, for example, signalling information, each cell (32,34,36) will be identified by VPI/VCI (previously allocated by the intermediate system for signalling messages) in the cell header (38,40). If the information carried in the cells is, for example, management information, each cell will be identified by another VPI/VCI (previously allocated by the intermediate system for management messages) in the cell header (38,40). The cells (32,34,36) are then transmitted over the broadcast downlink (2) to all end systems (8,10) (box 112). Each end system will receive each cell (box 113) and will check if the VPI/VCI of the cell is one that is allocated to it (Box 114). If so, it will extract the MID header that identifies the end system from the ATM payload of the cell (Box 116). Otherwise the end system will discard the cell (Box 117). If the cell is accepted, the end system will check if the MID value is its own (Box 118). If so, the cell is queued for reassembly (Box 119). Otherwise the cell is discarded (Box 120).

Figure 10:
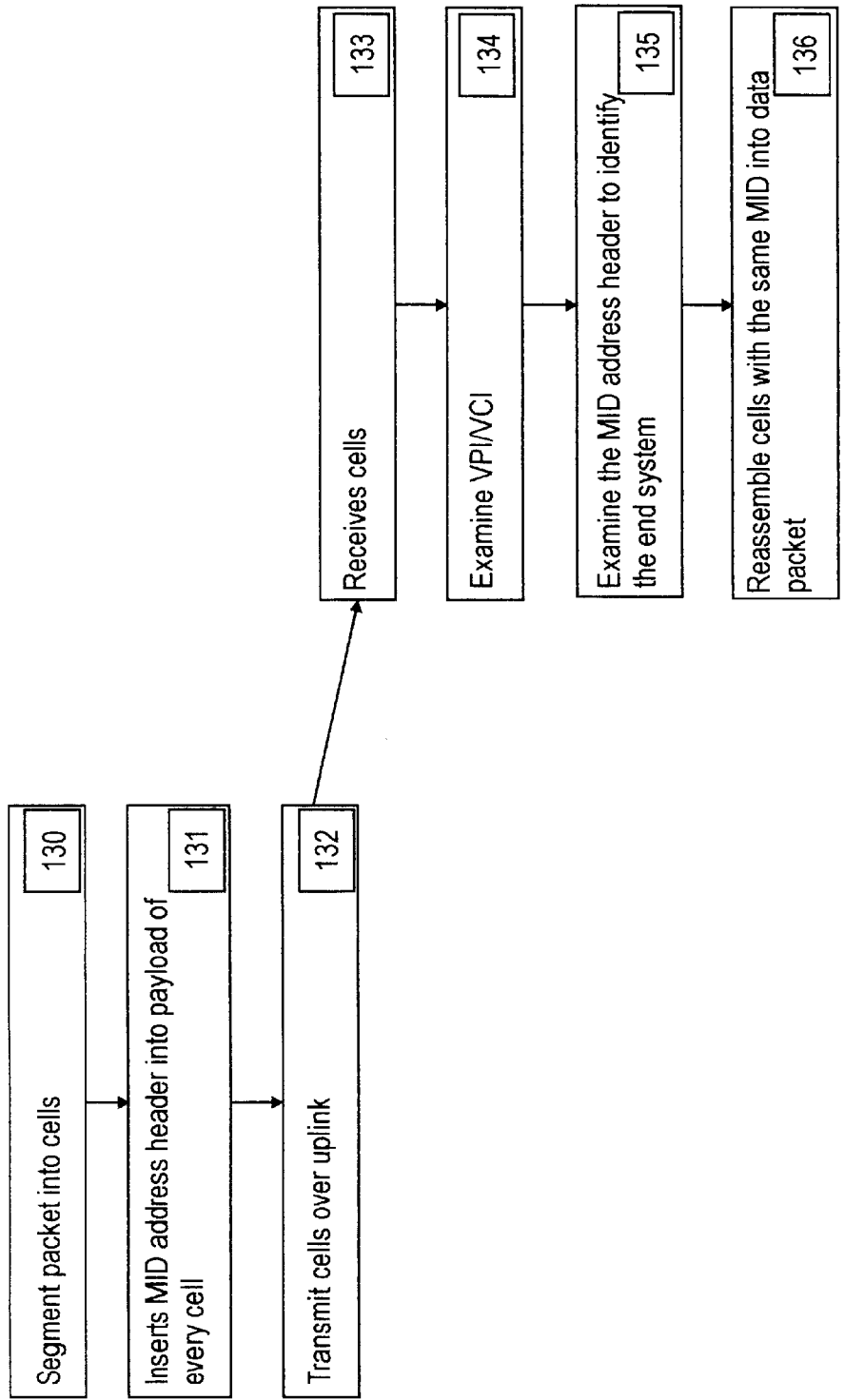
FIG. 10 is a schematic representation of the steps involved in transmitting a packet from an end system to an intermediate system with a MID header address in every cell of the packet.

Referring to FIG. 10, to send a packet from the end system (8) to the intermediate system (4,6) over the uplink (2), the end system segments the packet into cells (box 130), inserts a MID header into the ATM payload of every cell (box 131) and transmits the cells to the intermediate system over the uplink (box 132). The intermediate system receives the cells (box 133) and examines the VPI/VCI (Box 134). It then extracts the MID header from each cell payload to identify the end system (Box 135). The intermediate system then reassembles all the cells with the same MID to reconstruct the data packet transmitted by the end system (Box 136).

Figure 11:
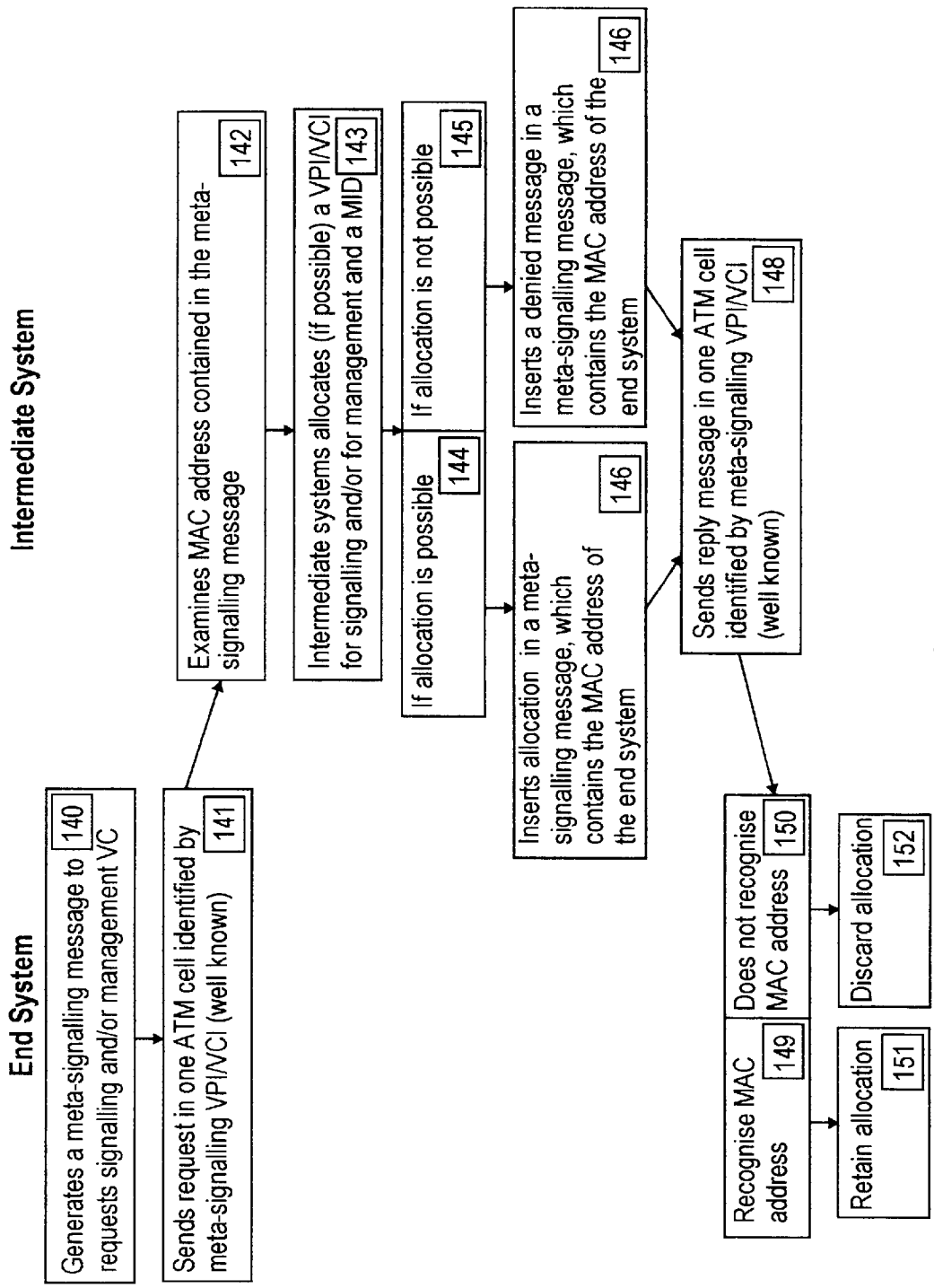
FIG. 11 is a schematic representation of the steps involved in the allocation of a signalling and/or management VC by the intermediate system.

Referring to FIG. 11, which shows the steps for an end system to obtain a signalling address, a management address and a MID address if they have not already been allocated. An end system that needs a signalling and/or a management VC generates a meta-signalling message containing the request for a signalling and management VC (Box 140). A meta-signalling messages is 48 bytes long and so can be encapsulated by an end system in one ATM cell, which is identified by the meta-signalling VPI/VCI (well known value) (Box 141). All the end systems in a shared uplink use this same VPI/VCI for sending meta-signalling messages. The meta-signalling message includes the MAC address of the end system. The intermediate system receives all the meta-signalling messages from all the end system in the multiple access segment. It examines the MAC address contained in each message to identify the end system that has originated the request (Box 142). The intermediate system allocates, if possible, a VPI/VCI for signalling and/or a VPI/VCI for ILMI in accordance with the request in the meta-signalling message from the end system. It also allocates a MID address, which will be used together with the VPI/VCI by the end system for sending signalling or management messages (Box 143). If resource is available, the intermediate system inserts the allocation in a reply meta-signalling message (Box 146), otherwise it inserts a deny message in a reply meta-signalling message (Box 147). The reply meta-signalling message contains allocated VPI/VCI for signalling and/or management and the MAC address of the end system the reply in intended for. The reply meta-signalling message is then encapsulated in one ATM cell identified by the meta-signalling VPI/VCI. This meta-signalling message is sent through the broadcast downlink (2) (Box 148). A deny message also contains the MAC address of the end system and is encapsulated in one ATM cell identified by the meta-signalling VPI/VCI. This message is transmitted over the broadcast downlink (2) (Box 148).

Therefore, all end system in the same multiple access segment receive all the meta-signalling messages sent by the intermediate system. Each end system, processes every ATM cell identified by the meta-signalling VPI/VCI, and checks if the MAC address contained in the message is its own (Box 149, 150). If so it retains the message for further processing (Box 151), otherwise it ignores the allocation (Box 152). If the message is a reply message it retains the allocation of signalling and/or management VPI/VCI and MID address for subsequent use. If the message is a deny message the end system will try again to request a signalling and/or management VC (ie. it starts again at Box 140).

In a preferred implementation, the VPI value used for meta-signalling could be associated with the beam number in order to facilitate the routing of meta-signalling messages to the destination beam. The beam number is the number allocated to a particular MA segment, where several MA segments are associated with the same headend.

As discussed above in a shared medium uplink, the link between the end systems and the intermediate system is shared among all the end systems and the capacity of this link is a scarce resource. One solution is to hide the state of the SAAL from the signalling layer Q.2931 so that the SSCOP can be allowed to go up or down without effecting the operation of the signalling layer. The SSCOP can then be brought up whenever a new call is set up or released and only for the duration of the call set up or release. This means that the part of the shared medium uplink, which otherwise would have been taken up with SSCOP keep alive messages to all end systems can be utilised for other traffic. However, because the SSCOP has to be brought up before a call can be set up, this can increase the time taken to set up a call.

Note the SSCF (System Specific Co-ordination Function) in the FIG. 7a and 7b SAALs adapts SSCOP to the signalling layer.

Where the VPI/VCI space is used to contain at least part of an end system address, if SSCOP is not kept alive, ATM signalling virtual channels VCs (i.e. the signalling addresses) can be allocated dynamically on a demand basis for each SSCOP session, ie for each period the SSCOP comes up to set up or release a call. This reduces the number of ATM signalling virtual channels required at any one time from one per terminal to one per terminal in call set-up or release (this is because ATM signalling information only has to be transmitted at call set up or call release). Thus, each time the SSCOP comes up it is told which are its dynamically allocated signalling VPI/VCI for that session.

To minimise the need for permanently allocated SSCOP connection slots to each end system, modifications are made to the ATM management and signalling state mechanisms. Referring to FIGS. 7a and 7b a specific SSCF (SSCF*) is used so that the SAAL is maintained in the up condition regardless of the state of SSCOP. This allows the intermediate system to offer calls to the end system and vice versa without continuous maintenance of an SSCOP connection. The SSCOP for a signalling entity (which may be an end system or an intermediate system) will begin to be brought up either in response to a service primitive from the Q.2931 layer requesting data transfer or in response to the receipt of a data indication primitive from the CP-AAL, for example because of the reception of an SSCOP begin PDU from a peer signalling entity.

For end systems the need to bring up the SSCOP layer will trigger a request on a dedicated service request channel on the uplink (that is unless the intermediate system initiates the bringing up of the SSCOP layer by the sending to it of an SSCOP PDU (Protocol Data Unit) and uplink slots are already communicated to the end system and tagged as available for signalling by a received SSCOP PDU.

If SSCOP is brought up periodically to allow ATM signalling for satellite systems it is desirable to maximise the transaction efficiency and thereby minimise call set-up delay. Since for many calls the SSCOP protocol must be established the SSCOP is extended to allow concatenation of SSCOP PDUs and the signalling PDUs required for call set up or release. The SSCOP must be modified to permit transmission of a data PDU, ie. the ATM signalling PDUs before the SSCOP is fully up.

Figure 12:
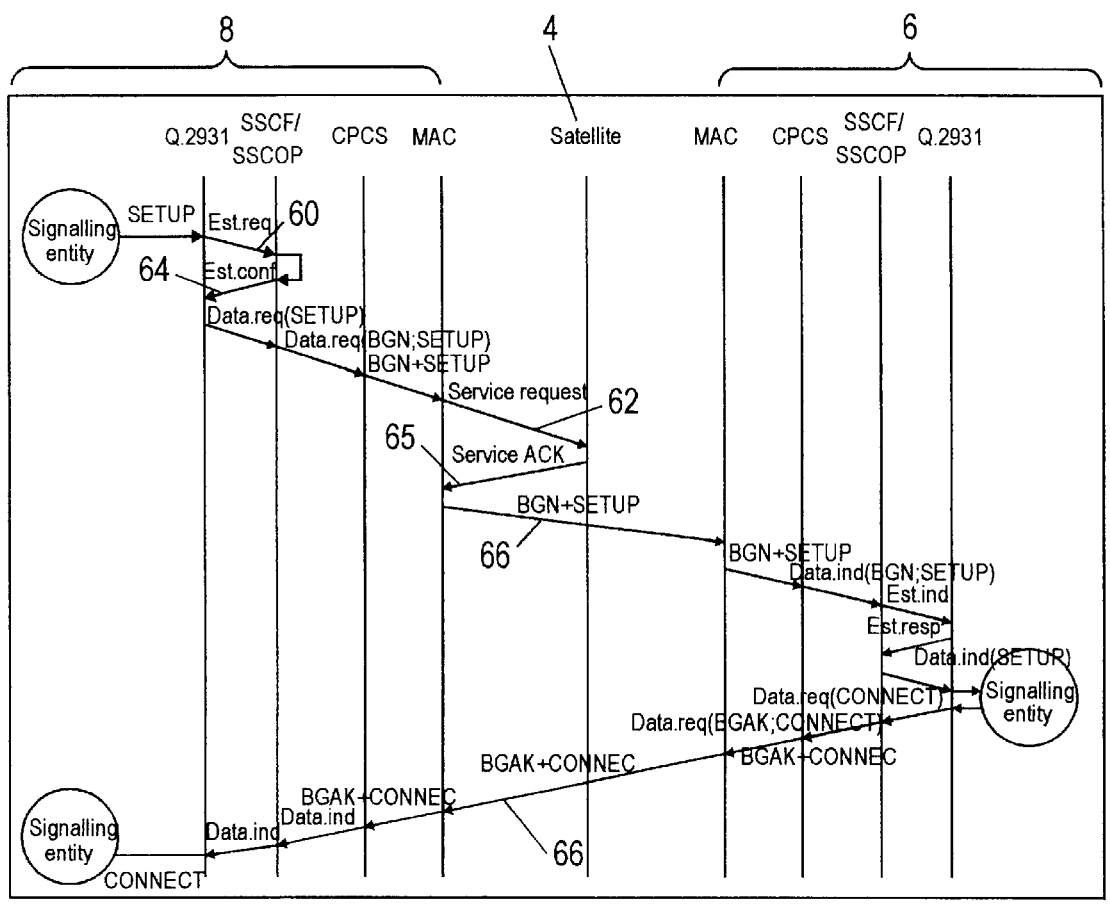
FIG. 12 is a schematic representation of an integrated SSCOP connection set up and call set up procedure according to the present invention.

Thus, referring to FIG. 12, this allows a signalling entity (eg. an end system (8)) to transmit a Q.2931 SETUP message with only the service request delay. The Q.2931 signalling entity sends an establish request primitive (60) to the SSCF*/SSCOP layer, which then sends an establish confirm primitive back to the Q.2931 layer (64) (so that the Q.2931 behaves as though the SSCOP is up) without the SSCOP having to send a SSCOP BEGIN request signal to a peer signalling entity (eg. controller (6)) and receive a BEGIN acknowledgement signal from the controller (6). This allows the Q.2931 layer to send a data request primitive and the SSCOP to send a SSCOP BEGIN request message to the Common Part Convergence Sublayer CPSC layer below. The CPSC layer encapsulates in an SSCOP data PDU both the SSCOP BEGIN request message and the Q.2931 ATM signalling CALL SETUP message and sends the composite PDU to the MAC layer. The MAC layer requests (message 62) the allocation of slots necessary to send the composite PDU. The satellite (4) allocates the end system (8) temporary slots from its designated channels and sends an acknowledgement signal (65) indicating which slots have been allocated. Then the MAC layer sends a message (66) comprising the composite PDU via satellite (4) on the temporarily allocated slots. When the message that contains the CALL SETUP signalling message and the SSCOP BEGIN message arrives at the ground based controller (6), a data indication is sent up to the SSCF/SSCOP layer of the controller, which then sends an establish indication to the Q.2931 layer to indicate that a BEGIN PDU has been received. The Q.2931 acknowledges the reception of the BEGIN PDU by sending an establish response to the lower layers of the controller (6). At this point the Q.2931 layer is ready to receive the data indication primitive containing the CALL SETUP signalling message. The controller then processes this CALL SETUP message and, if appropriate sends a connect message to the end system (8). In order to do this, the Q.2931 sends a data request primitive containing the connect message to the SSCF/SSCOP layer and the SSCF/SSCOP layer then sends a data request primitive containing a connect message and SSCOP begin acknowledgement message to the CPSC layer. These two messages are then encapsulated in an SSCOP PDU which is sent (66) to the end system. When the end system (8) receives this PDU the SSCOP connection is established and the connect message is sent to the end system signalling entity.

By combining the SSCOP set up messages and the Q.2931 call set up signalling messages in a single PDU the SSCOP is brought up and the call is set up with only a single round trip delay.

All changes to the conventional ATM signalling protocols are in the SAAL. Both the ATM and Q.2931 layers are unmodified.

Conventionally, the ATM end system registration process using ILMI which allocates the end system address to an end system is triggered by the activation of the physical link between the end system and the intermediate system. In the present invention this registration process is triggered by the receipt of a service request from the end system. If the end system is already registered on the intermediate system no registration is required. Registration is only required when the end system is not already registered on the intermediate system associated with the common medium uplink. The ILMI management channel can be multiplexed onto a given VPI/VCI using the IASAR layer just as for the signalling channel. The destination MAC address for the registration procedure is taken from the service request message. It can be seen that elements of the ILMI registration process are redundant since the MAC address is already of necessity known. This redundancy is accepted to keep the ILMI process standard. Since the ILMI process is not performed per call but per end system move the overhead is not significant.

What is claimed is:

1. A multiple access asynchronous network system for providing network access to a plurality of end systems over a shared medium uplink of a multiple access asynchronous network segment to a satellite headend supported by a network controller, wherein the network controller comprises means for allocating part of the uplink resource and the satellite headend comprises means for allocating part of the uplink resource on a temporary basis in response to end systems making a new request for uplink resource.

2. A system according to claim 1 wherein the part of the uplink resource allocated by the satellite headend comprises one or more channels of the shared medium uplink.

3. A system according to claim 1 wherein the part of the uplink resource allocated by the satellite headend comprises one or more slots from the shared medium uplink.

4. A method for providing network access to a plurality of end systems over a shared medium uplink of a multiple access asynchronous network segment to a satellite headend, which satellite headend is supported by a network controller, comprising the steps of temporarily allocating uplink resource to an end system using the satellite headend in response to said end system making a new request for uplink resource and subsequently allocating uplink resource to said end system using the network controller.

5. A method according to claim 4 wherein the part of the uplink resource allocated by the satellite headend comprises one or more channels of the shared medium uplink.

6. A method according to claim 4 wherein the part of the uplink resource allocated by the satellite headend comprises one or more slots from the shared medium uplink.

7. A system according to claim 1 wherein the satellite headend supported by the network controller comprises an intermediate system comprising means for allocating an address to each end system and means for inserting the end system address into, the VPI/VCI space of a cell which is to be transmitted over the segment and which address is allocated with that end system using substantially all the VPI/VCI space of a cell.

8. A signalling system according to claim 7 wherein each end system comprises means for inserting the end system address associated with that end system into the VPI/VCI space of a cell to be transmitted over the segment using substantially all the VPI/VCI space of the cell.

9. A signalling system according to claim 7 wherein the intermediate system allocates each end system a data address.

10. A signalling system according to claim 7 wherein the intermediate system allocates each end system a signalling address.

11. A signalling system according to claim 7 wherein the intermediate system allocates each end system a management address.

12. A signalling system according to claim 7 wherein the intermediate system allocates each end system a data address, a signalling address and a management address.

13. A system according to claim 7 wherein a broadcast downlink supplements the shared medium uplink in the network segment and an address in the VPI/VCI space of a cell sent over the downlink to a particular end system is the same as the address in the VPI/VCI space of a cell sent on the uplink from that end system.

14. A system according to claim 7 wherein the intermediate system comprises means for dynamically allocating addresses.

15. A signalling system according to claim 7 wherein for point-to-multipoint connections when there are a plurality of receiving end systems in the same multiple access asynchronous segment the intermediate system comprises means for dynamically allocating the same address to all said plurality of receiving end systems.

16. A system according to claim 7 in which the intermediate system comprises means for dynamically allocating each end system a signalling address, wherein the end system and intermediate system comprise a signalling layer and an SSCOP layer arranged so that an SSCOP connection between the end system and the intermediate system can be broken without affecting the operation of the signalling layer.

17. A method according to claim 4, in which substantially the entire VPI/VCI space of a cell or a cell header transmitted over the segment is made available to contain an address of an end system associated with that cell.

18. A method according to claim 17 wherein addresses are allocated dynamically.

19. A method according to claim 17 wherein the addresses are allocated dynamically and the set up of point-to-multipoint connections when there are a plurality of receiving end systems in the same multiple access asynchronous segment comprises the step of allocating the same end system address to all said plurality of receiving end systems.

20. A signalling method according to claim 17 in which each end system is allocated a signalling address dynamically, comprising the steps of allowing an SSCOP connection between an end system and an intermediate system to break without affecting the operation of a signalling layer in the end system and in the satellite headend supported by the network controller.

21. A signalling method according to claim 17 wherein a broadcast downlink supplements the shared medium uplink in the network segment and an address in the VPI/VCI space of a cell sent over the downlink to a particular end system is the same as the address in the VPI/VCI space of a cell sent on the uplink from that end system.

22. An Integrated Addressing and packet Segmentation And Reassembly (IASAR) system for use in a multiple access asynchronous network segment for providing network access for a plurality of end systems to an intermediate system over a shared medium, wherein the end systems and the intermediate system comprise means for inserting a Multiplexing Identifier (MID) address header designating an end system into the cells generated from a packet during packet segmentation.

23. A system according to claim 22 which said end systems and intermediate system additionally comprise means for extracting a Multiplexing Identifier (MID) address header designating an end system from each cell generating a packet during packet reassembly.

24. A system according to claim 22 wherein a multiplicity of signalling channels each associated by a MID header with an individual end systems are carried over a single virtual channel (VC).

25. A system according to claim 22 wherein a multiplicity of ILMI management channels each associated by a MID header with an individual end systems are carried over a single virtual channel (VC).

26. A system according to claim 22 comprising a SAAL stack in an end and/or intermediate system comprising an AAL¾ ATM adaptation layer including a Packet Segmentation and Reassembly sub-layer for generating ATM cells which include a multi-bit field for the MID address header.

27. A method for Integrated Addressing and Packet Segmentation and Reassembly (IASAR) for use in a multiple access asynchronous network segment for providing network access for a plurality of end systems to an intermediate system over a shared medium, comprising the steps of segmenting a packet to generate a group of cells and inserting a Multiplexing Identifier (MID) address header designating an end system into each cell payload of said group of cells.

28. A method according to claim 27 additionally comprising the steps of reassembling a packet from a group of cells with the same Multiplexing Identifier (MID) address header designating an end system.

29. A method according to claim 27 additionally comprising the step of using an AAL¾ ATM adaptation layer including a Packet Segmentation and Reassembly sub-layer in the SAAL stack in an end and/or intermediate system for generating ATM cells which include a multi-bit field for the MID address header.

30. A signalling system for use in a multiple access asynchronous network segment for providing network access for a plurality of end systems to an intermediate system over a shared medium uplink wherein the intermediate system comprises means for receiving a meta-signalling message from an end system containing the MAC address of that end system, means for allocating a signalling VC and/or a management VC and a Multiplexing Identifier (MID) value to that end system and means for transmitting a meta-signalling message to the end systems in the network segment containing the MAC address of that end system and the allocated VC(s) and MID value.

31. A signalling method for use in a multiple access asynchronous network segment for providing network access for a plurality of end systems to an intermediate system over a shared medium uplink, in which the intermediate system allocates a signalling VC and/or management VC and a Multiplexing Identifier (MID) value by means of an exchange of meta-signalling messages between the end system and the intermediate system, which meta-signalling messages contain the end system's MAC address.

32. A signalling system for use in a multiple access asynchronous network segment for providing network access for plurality of end systems to an intermediate system over a shared medium uplink wherein each end system and the intermediate system comprise a signalling layer and an SSCOP layer arranged so that SSCOP connections between each end system and the intermediate system can be broken without affecting the operation of the signalling layers.

33. A signalling system according to claim 32 wherein the signalling layer in the end system comprises means for initiating sending of a message by joining together an SSCOP establishment message and a signalling call set up message to form a composite request message which is transmitted over the common medium uplink.

34. A signalling system according to claim 32 wherein the segment comprises a broadcast downlink and the signalling layer in the intermediate system comprises means for initiating sending of a message to one of the end systems by joining together an SSCOP establishment message and a signalling call set up message to form a composite message which is transmitted over a broadcast downlink.

35. A signalling method for use in a multiple access asynchronous network segment for providing network access for a plurality of end systems to an intermediate system over a shared medium uplink wherein each end system and the intermediate system comprise a signalling layer and an SSCOP layer, comprising the steps of breaking SSCOP connections between each end system and the intermediate system without affecting the operation of the signalling layers.

36. A signalling method according to claim 35 comprising the steps of initiating sending of a message in an end system by joining together an SSCOP establishment message and a signalling call set up message to form a composite request message and transmitting said composite request message over the common medium uplink.

37. A signalling method according to claim 35 wherein the segment comprises a broadcast downlink, comprising the steps of initiating sending of a message in the intermediate system to one of the end systems by joining together an SSCOP establishment message and a signalling call set up message to form a composite message and transmitting said composite message over the common medium downlink.

* * * * *